United States Patent

[11] 3,552,574

| [72] | Inventors | Edison Lowe<br>El Cerrito;<br>Everett L. Durkee, El Sobrante, Calif. |
|---|---|---|
| [21] | Appl. No. | 837,480 |
| [22] | Filed | June 30, 1969 |
| [45] | Patented | Jan. 5, 1971 |
| [73] | Assignee | the United States of America, as represented by the Secretary of Agriculture |

[54] REVERSE OSMOSIS SYSTEM
1 Claim, 7 Drawing Figs.

[52] U.S. Cl. ...................................... 210/353, 210/23
[51] Int. Cl. ........................................ B01d 13/00
[50] Field of Search ............................ 210/19, 23, 321, 353, 354, 197, 389

[56] References Cited
UNITED STATES PATENTS

| 3,228,877 | 1/1966 | Mahon .......................... | 210/22 |
| 3,331,772 | 7/1967 | Brownscombe et al....... | 210/23 |
| 3,425,562 | 2/1969 | Hamer.......................... | 210/353X |
| 3,449,245 | 6/1969 | Johnson et al................ | 210/23 |

FOREIGN PATENTS

| 548,246 | 11/1957 | Canada ........................ | 210/321 |

OTHER REFERENCES
Reverse Osmosis
Roga Laboratory Reverse Osmosis Unit Model III, Applications Engineering Reverse Osmosis Program, Gulf General Atomic, P.O. Box 608, San Diego, California 92112 (714-297-4341)

*Primary Examiner* — Samih N. Zaharna
*Attorney* — R. Hoffman, W. Bier and W. Takacs ABSTRACT: Reverse osmosis system provided with means for promoting turbulence and for scouring the membrane surface whereby to prevent concentration polarization and skinning (false membrane formation). These valuable results are attained by periodic movement of a plurality of free spheres in the interface zone, at or near the membrane surface.

E. LOWE and E. L. DURKEE
INVENTORS

BY R. Hoffman & W. Takacs
ATTORNEYS

3,552,574

REVERSE OSMOSIS SYSTEM

A nonexclusive, irrevocable, royalty-free license in the invention herein described, throughout the world for all purposes of the United States Government, with the power to grant sublicenses for such purposes, is hereby granted to the Government of the United States of America.

DESCRIPTION OF THE INVENTION

The invention relates in general to the art of reverse osmosis. More particularly, the invention is concerned with and has among its objects the provision of novel apparatus for conducting reverse osmosis. Further objects of the invention will be evident from the following description wherein parts and percentages are by weight, unless otherwise specified.

In recent years it has been shown that reverse osmosis is useful for concentrating liquid foods such as fruit juices, vegetable juices, milk, egg white, and the like. See, for example, our Patent 3,341,024. Typically, in concentrating a juice by reverse osmosis, the juice is applied under superatmospheric pressure against a suitable membrane. Water (from the liquid) passes through the membrane whereas valuable components of the juice such as sugars, fruit acids, flavor components, etc. are rejected (not passed) by the membrane with the net result that there is formed a residue of concentrated liquid on the upstream side of the membrane. The permeate (water) and concentrate are separately discharged from the system.

In conducting reverse osmosis operations, problems are encountered because of certain changes which take place in the region at or near the upstream surface of the membrane. The changes which take place in this region (hereinafter referred to as the interface or the interface region) are explained as follows:

When a juice, for example, is first applied under superatmospheric pressure against a membrane, water from the juice will diffuse through the membrane leaving a residue of concentrated juice. Since this action necessarily takes place primarily in the interface region, there is formed a stratum of concentrated juice in this region. This stratum impedes further operation of the system. In the first place the stratum increases the osmotic pressure which must be overcome to allow reverse osmosis to operate. This situation can best be explained by the following illustration: If the juice being treated has a soluble solids content 10 percent, one can readily determine from available data that the osmotic pressure to be overcome (to allow reverse osmosis to proceed) is 200 p.s.i. If, however, there is a stratum of concentrated juice (containing, say 20 percent soluble solids) at the interface region, then the osmotic pressure to be overcome will be 450 p.s.i. In other words, if the stratum remains in place the system will cease to operate unless pressure on the juice is increased to above 450 p.s.i. Moreover, the same problem will recur as more highly concentrated stratum are formed, necessitating further increases in applied pressure. A second mechanism which impedes the desired result is development of what may be termed a false membrane. Juices naturally contain high molecular weight components such as polysaccharides and/or proteins in addition to low molecular weight components such as sugars and fruit acids. As reverse osmosis continues, the juice in the interface region may become so concentrated that the high molecular weight components will drop out of solution and form a skin or false membrane covering the regular membrane. The net result is, of course, that water has to diffuse through a thicker total membrane whereby the flux (rate of diffusion of water) will be seriously decreased.

A primary object of the invention is the provision of an apparatus which obviates the problems outlined above.

The manner in which the objects of the invention are attained is next described in detail, having reference to the annexed drawing, wherein.

In the figures, various parts, particularly the membranes and membrane sandwiches, are depicted with exaggerated thickness for clarity of illustration.

Figure 1:
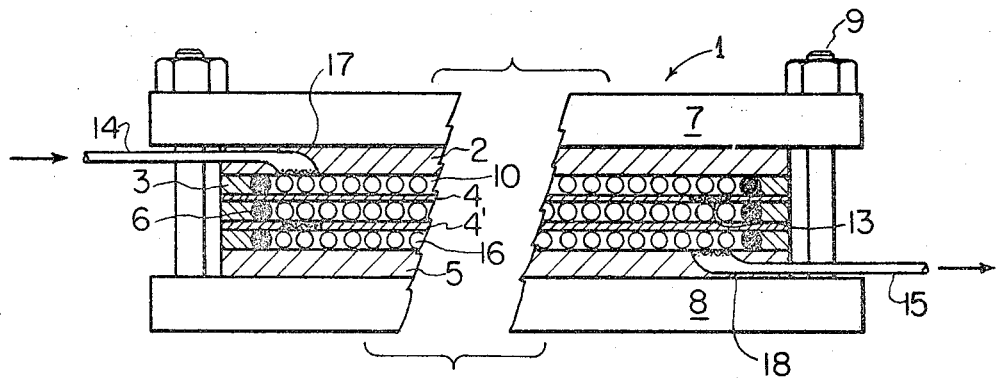
FIG. 1 is a diagrammatic view, partly in cross section, of one modification of the reverse osmosis unit of the invention.

Referring now to FIG. 1, reference numeral 1 designates a reverse osmosis unit wherein a juice, for example, may be concentrated.

Reverse osmosis unit 1 is made up of a stack of coacting elements: Plate 2, spacer ring 3, membrane sandwich 4, another spacer ring 3, membrane sandwich 4', another spacer ring 3, and plate 5.

Each of the spacer rings 3 is provided with an O-ring 6 of rubber, Neoprene, or other elastomer for sealing purposes—for example, for establishing a pressuretight chamber or cavity between adjacent membrane sandwiches.

To simplify the drawing only two membrane sandwiches 4 and 4' are depicted. It is obvious that in practice one would supply as many of these as necessary to provide a desired area for diffusion. Use of more membrane sandwiches would, of course, also require additional spacer rings and O-rings to properly separate the membrane sandwiches as shown with 4 and 4'.

The stack of coacting elements is clamped between jaws 7 and 8 by bolts 9. (In the figure, only two bolts 9 are depicted to simplify the drawing. It is obvious that in practice one would provide a series of bolts spaced equidistantly about the entire periphery of the stack to form a pressuretight whole).

By the arrangement described there is provided within the stack a series of chambers or cavities 10, each of which serves to hold a liquid under pressure and apply it against the membrane or membranes with which it is in communication. The various cavities 10 are in connection with one another via screened ports 13 arranged in membrane sandwiches 4 and 4'.

The liquid to be treated enters the stack via pipe 14 which communicates with a bore 17 cut into plate 2. The treated liquid or concentrate leaves the stack via a bore 18 cut into plate 5 which communicates with pipe 15. The permeate leaves at the edges of the stack as explained below in connection with FIG. 2.

Within chambers 10 are a plurality of scouring elements—free spheres 16 made of glass, ceramic, stainless steel, noble metal, hard rubber, or plastics, for example, acrylic, nylon, or ply polyperfluoroethylene ("Teflon"), or the like. The number of spheres is so regulated that they do not completely fill chambers 10, i.e., enough space is left so that the spheres can be shifted about within each chamber 10. Since the spheres in operation contact the membranes, they should have smooth surfaces—i.e., be free from flash, burrs, edges, etc., so that they will not damage the membrane surface. The spheres are generally all of the one size but can be of varying sizes, e.g., some small, some larger, and others of intermediate sizes.

The screened ports 13 in membrane sandwiches 4 and 4' and the screened bores 17 and 18 keep each allotment of spheres within its own cavity 10.

In operation, spheres 16 are oscillated back and forth within cavities 10 by periodically shifting the mass of liquid within unit 1 in alternate directions, i.e., from the feed end toward the discharge end and then vice versa. The manner in which this is accomplished is explained in detail below in connection with FIG. 4. The oscillation of the spheres effectuates the desired result of preventing concentration polarization and skinning (formation of false membranes).

Figure 2:
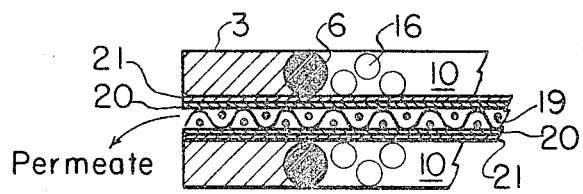
FIGS. 2 and 3 are detail sections, on an enlarged scale, illustrating the elements of the membrane sandwich which forms a part of the reverse osmosis unit.

Reference is now made to FIG. 2 which depicts in detail the construction of membrane sandwiches 4 and 4'. Each consists of an inner Core 19 of wire screening. Sheets 20 of filter paper are placed on each side of the core, and finally the outermost layers are membrane 21.

As membranes 21 one may use any of the known films which display semipermeable properties and particularly those which have a high water/solute diffusivity ratio, in other words, those which exhibit a high permeability to water but a low permeability to solutes. Thereby water can flow through the membranes whereas the passage of solutes, e.g., dissolved salts; sugars; citric, malic and other fruit acids; flavor components, etc., as may be present in the liquid under treatment is prevented or at least impeded to a large degree. Various membranes which exhibit these properties are known in the art and described in the literature, for example: Lowe and Durkee, Patent 3,341,024; Reid and Breton, Jour. of Applied Polymer Science, Vol. 1, pages 133—143; U.S. Pat. Nos. 3,133,132 and 3,133,137; and Morgan et al., Food Technology, Vol. 19, pp. 52—54.

In operation, water from the liquid in cavities 10 permeates through membranes 21, then passes transversely of the stack (through the core of the sandwich) and is discharged at the edges as depicted by the arrow in FIG. 2. Some of the permeate may also be carried in the same direction through the sheets 20 of filter paper.

Figure 3:
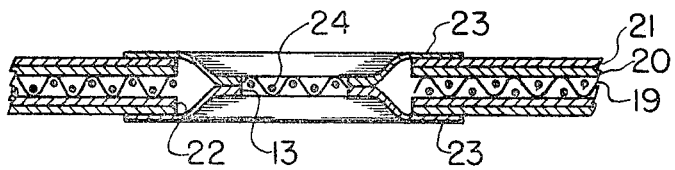

Reference is made to FIG. 3 which depicts details of construction of screened port 13 which provides communication (for liquids) between adjacent cavities 10. A membrane sandwich is fabricated by compositing wire screen core 19, filter papers 20, and membranes 21. A hole 22 is then punched through the sandwich. Next, circular pieces 23 of "Teflon" self-adhering tape are adhered to the top and bottom of the sandwich, and to one another in the void area. Then, a passageway 13 is punched through the adhered pieces 23, making sure that there is a peripheral area of firmly adhered material about the circumference of the hole. In this way, the edges of the passageway are sealed so that liquid from cavities 10 cannot directly flow into the core 19 of the membrane a sandwich. In a final operation, a circle of wire mesh 24 is cemented in place with an epoxy resin or the like.

Figure 4:
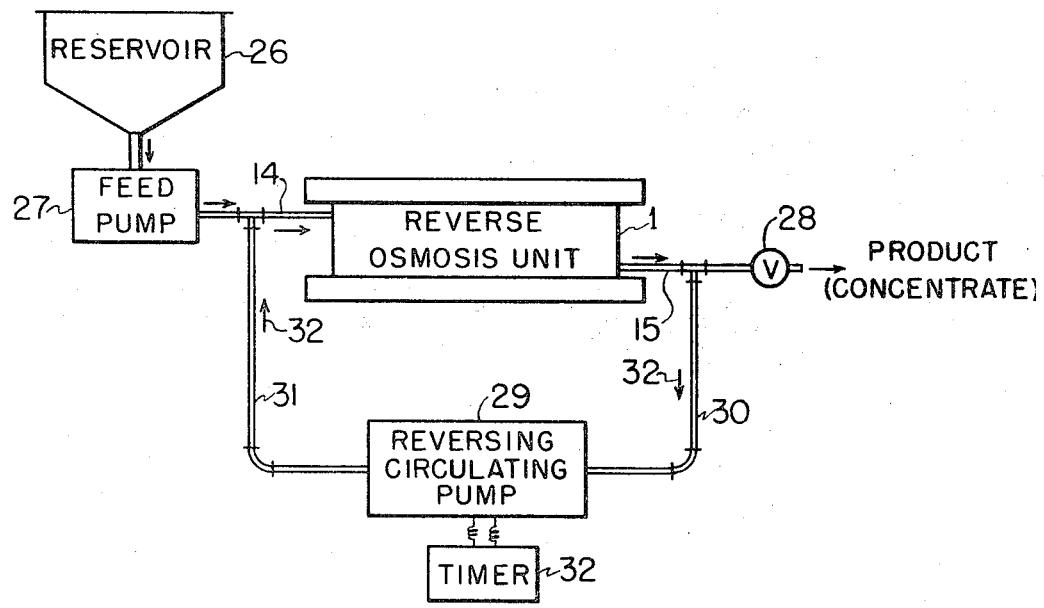
FIG. 4 is a diagram illustrating the arrangement of the reverse osmosis unit with its piping, pumps, and other auxiliary elements.

FIG. 4 illustrates reverse osmosis unit 1 connected up for operation. A reservoir 26 is provided for holding the juice or other liquid to be treated. A pump 27 is provided to introduce the juice or other liquid to be treated into the system. During the operation, pump 27 meters the juice into the system as necessary to maintain a constant pressure therein. The pressure selected will vary depending on such factors as the type of juice, type of membranes, the degree of concentration desired, etc. In typical runs the pressure is maintained at about 500—2000 p.s.i.g.

As evident from FIG. 4, the juice from feed pump 27 flows into reverse osmosis unit 1 via pipe 14. The liquid leaving unit 1 via pipe 15 is in part recirculated and in part withdrawn as product via throttling valve 28. In an alternative method of operation, valve 28 is not used; the product is withdrawn from the system by the metering device disclosed in our copending application Ser. No. 800,193, filed Feb. 18, 1969.

A pump 29 is connected in the system via pipes 30 and 31 to form a circulating loop. Pump 29 is of the reversing type so that it can circulate liquid in either direction through the loop, and is actuated by timer 32. This timer is set so that pump is actuated in pulses directing liquid in one direction then in the other with the pulse in the direction indicated by arrows 32 involving moving of a greater proportion of liquid. Typically, the parameters of the system will be so arranged that the main pulse (that in the direction indicated by arrows 32) and the opposite pulse involve movements of liquid in the volumetric proportion of 100 for the main pulse to about 60—80 for the opposite (minor) pulse. This pulsating movement of the liquid in the system is, of course, transmitted to the liquid in cavities 10 and to the spheres 16 in these cavities. As a result, these spheres surge back and forth in their respective cavities, causing turbulence which prevents concentration polarization and also causing a scouring effect so that skinning does not occur. In moving back and forth the spheres tumble about so that they scour not only the membrane surfaces at the bottoms of the cavities but also the membrane surfaces at the tops of the cavities.

As explained above, pump 29 is operated in such fashion that the pulse in the direction of arrows 32 is greater than that in the opposite direction. This is desirable so that the liquid in the system will have an overall movement in the necessary direction, that is, from the feed end of unit 1 toward the product end of this unit.

In the modification of the invention illustrated in FIG. 4, a circulating pump of the reversing type is used to pulsate the liquid in the system and so cause the desired back-and-forth movement of spheres 16. It will be obvious to those skilled in the art that various other pumping systems can be provided to secure a like result. For example, one could provide two separate pumps, one of larger capacity than the other, and operate them in sequence, each for a set period of time. Alternatively, the pumps could be of like capacity and be operated sequentially, one for a longer period than the other.

In reverse osmosis units which utilize membranes having two long dimensions, such as those of circular, square, or similar shape (as opposed, for example, to membranes in the form of narrow cylinders which have only one long dimension), problems are encountered because movement of liquid is not uniform over the entire membrane area. Some areas—in a direct line between inlet and outlet ports, for example—will be utilized fully while other areas will be relatively stagnant and associated portions of the membrane will be idle.

Figure 5:
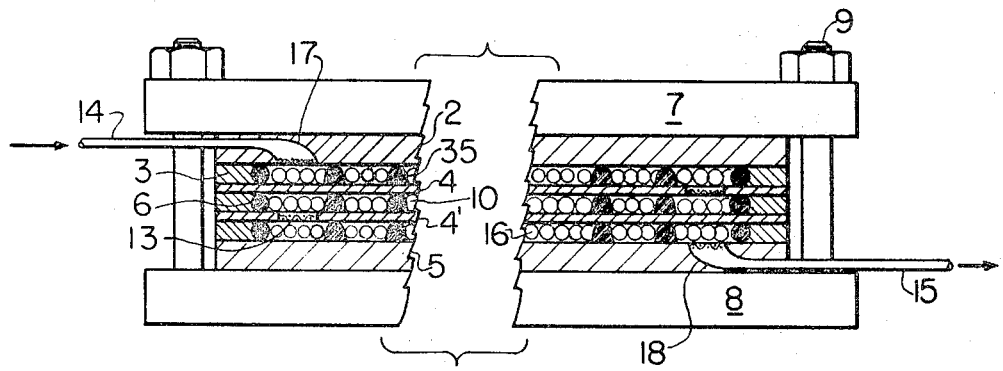
FIG. 5 is a diagrammatic view, partly in cross section, of another modification of the reverse osmosis unit.
Figure 6:
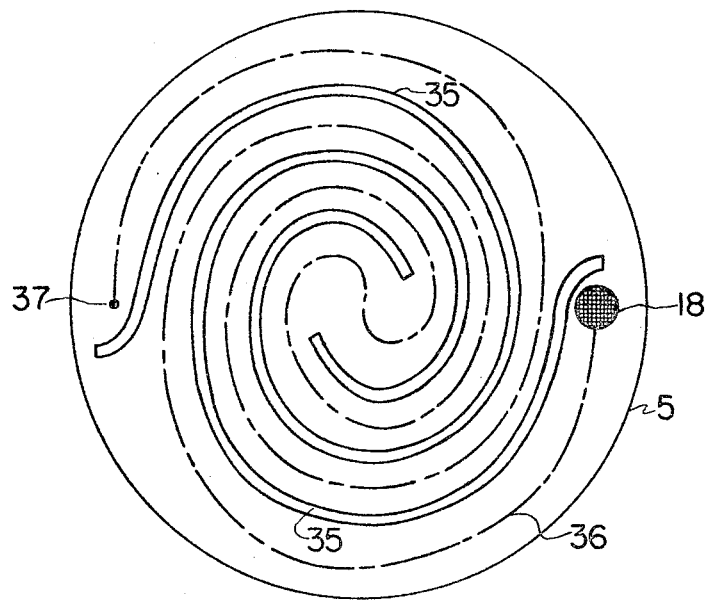
FIG. 6 is a plan view depicting in particular the guide means used in the modification of FIG. 5 to ensure proper channeling of liquid flow through the reverse osmosis unit.

FIGS. 5 and 6 illustrate a modification of our reverse osmosis unit which is provided with guide means for effective channeling of liquid flow through the unit so that essentially all areas of the membrane surface are utilized.

In the reverse osmosis unit of this modification the various parts are as in the modification of FIG. 1 with the exception of the guide means. These are strips 35 of rubber, Neoprene, or other elastomer arranged in spiral form as evident in FIG. 6. Strips 35 are cemented to an appropriate part of the unit, for example, to the top of plate 5 and to the top of membrane sandwiches 4 and 4'. Alternatively, strips 35 may be cemented to cores 19 (FIG. 2) and the filter paper 20 and membrane 21 arranged over the core and strips where the sandwich is fabricated. As to thickness, strips 35 should be so dimensioned that they are slightly thicker than cavities 10 so that when the stack is assembled they will press up against the next adjacent flat member and hence prevent bypassing of liquid.

Referring to FIG. 6, broken line 36 designates the general path for liquid flow from screened port 18 (connecting with discharge pipe 15) to the opposite end where, at the point designated 37, there is communication to the next higher cavity 10 via screened port 13 in membrane 4' (see FIG. 5). A similar flow pattern will, of course, exist in all the cavities of the reverse osmosis stack.

The modification of FIGS. 5 and 6 is provided with scouring spheres 16 as in the case of the previous modification and is operated in a system just as explained in connection with FIG. 4.

The invention is of wide applicability and can be used for the concentration of liquid foods of all kinds. Typical liquids to which the invention may be applied are listed below solely by way of example and not limitation:

Fruit and Vegetable Products: Juices, extracts, pulps, purees, and similar liquid products derived from fruits or vegetables such as orange, grapefruit, lemon, lime, apple, pear, apricot, strawberry, raspberry, cranberry, pineapple, grape, prune, plum, peach, cherry, tomato, celery, carrot, spinach, onion, lettuce, cabbage, potato, sweet potato, watercress, etc. The liquid products may be prepared in customary manner by subjecting edible portions of the produce to such operations as reaming, pressing, macerating, crushing, comminuting, extracting with water, cooking, steaming, etc. These operations may be applied to the fresh produce or to processed produce, that is, produce which has been subjected to such operations as cooking, blanching, freezing, canning, sun-drying, sulfiting or preservation by application of chemical preservatives or ionizing radiations.

Meat and Fish Products: Meat extracts, meat juices, soups or broths made from meat or fish products with or without added vegetative material, clam juice, oyster stew, fish or clam chowders, etc.

Lacteal Products: Whole milk, skim milk, whey, cream, buttermilk, yogurt, milk products containing such additives as chocolate, cocoa, sugar, malt, vitamins, sugar, etc.

Cereal Products: Aqueous extracts of cereals such as wheat, barley, malted barley, rice, corn, etc.

Beverages: Aqueous extracts of coffee, tea, chocolate, yerba mate, roasted cereal products (simulated coffee products), etc.

Carbohydrate Substances: Honey, maple syrup, corn syrup, sorghum syrup, molasses, etc.

Egg Products: Egg white, egg yolk, whole egg, or preparations of egg with other foods such as milk, cream, sugar, flavorings, etc.

Miscellaneous: Juices, extracts, purees and other liquid products made from alfalfa, clover, grasses, cottonseed or soybean meals, sugar cane, sugar beet, sorghum, animal blood, etc. Vitamin preparations such as solutions of ascorbic acid, thiamin or other vitamins, vitamin concentrates or precursors, fermentation products such as beers (culture liquors) containing mushroom mycelium, yeasts, biosynthezized vitamins, etc.

The invention may also be applied for preparing potable water from sea, brackish, or other saline waters and for preparing soft water from hard water.

EXAMPLE

The invention is further demonstrated by the following illustrative example.

In these runs the reverse osmosis unit was as in FIGS. 5 and 6, that is, it was equipped with spiral guides 35. The depth of cavities 10 was 0.174 inch; total cavity volume was 213 cc. The membrane was a commercial cellulose acetate product, heat-soaked prior to use at 85° C. The starting material was orange juice having a solids content of 11.7 percent. Operating pressure in the reverse osmosis unit was maintained at 1200 p.s.i.g.

In run A (in accordance with the invention) the reverse osmosis unit contained a quantity of acrylic spheres (five thirty seconds inch in diameter) providing a bulk volume of 132 cc. (actual or net volume of the spheres was about 83 cc.).

In run B (control) the spheres were removed from the reverse osmosis unit.

In both runs, the juice under treatment was subjected to pulsing action as herein described so that the volumetric proportion of the pulses was 100 in the inlet-to-outlet direction to 67 in outlet-to-inlet direction. The pulses were at the rate of 40 per minute; the volume of juice moved in each major pulse was about 60 cc., in each minor pulse about 40 cc.

Figure 7:
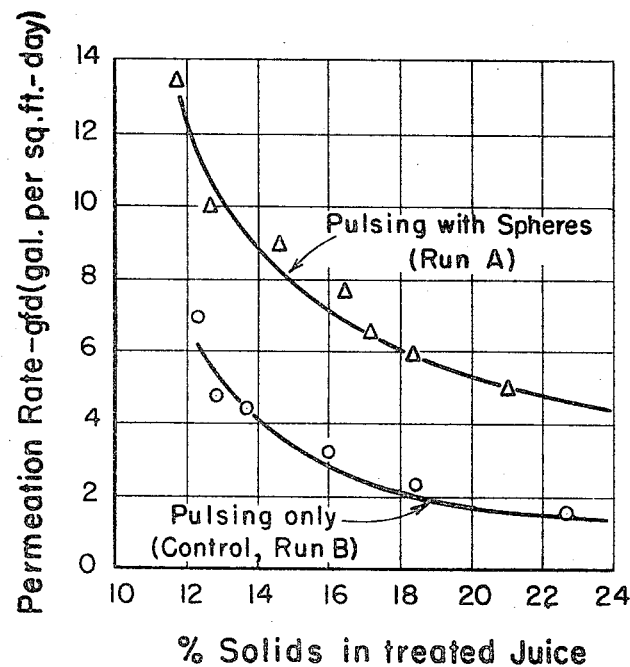
FIG. 7 is a graph demonstrating the superior results attained in accordance with the invention.

During the runs, samples of the treated (concentrated) juice were removed from time to time and the solids content thereof measured. Also, the permeate was collected and measured so that the permeation rate at each interval could be calculated. The results are shown in FIG. 7 wherein are plotted, for each run, the permeation rate versus the solids content of the treated (concentrated) juice. It is clearly evident that the application of the invention resulted in a desirable increase in permeation rate. For example, at a solids content of 24 percent, the permeation rate in Run A (in accordance with the invention) was 2.7 times that in Run B (control).

We claim:

1. Apparatus for conducting reverse osmosis which comprises, in combination:
   a. a diffusion cell including a flat membrane and a shallow cavity coextensive therewith for containing a liquid and applying it against the membrane;
   b. an inlet adjacent one end of the cavity;
   c. a pump for feeding a liquid under superatmospheric pressure through the inlet and into the cavity, whereby the liquid is applied under superatmospheric pressure against the membrane;
   d. an outlet adjacent the opposite end of the cavity;
   e. means for withdrawing treated liquid from the cavity through the outlet;
   f. means for withdrawing permeate which passes through the membrane;
   g. a plurality of free spheres within the cavity; and
   h. pump means communication with the inlet and outlet of the cavity for periodically shifting the liquid and the spheres in the cavity alternately in the direction from the inlet end to the outlet end and then from the outlet end to the inlet end whereby to cause turbulence and disrupt the interface at the membrane surface, said pump means being constructed and arranged to cause a greater shift in the inlet-to-outlet direction than in the outlet-to-inlet direction whereby to ensure the overall travel of the liquid from the inlet end of the cavity to the outlet end there of.